Feb. 27, 1968   F. G. HONERKAMP   3,370,521
VENTILATION ENCLOSURE STRUCTURE
Filed April 25, 1966   5 Sheets-Sheet 1
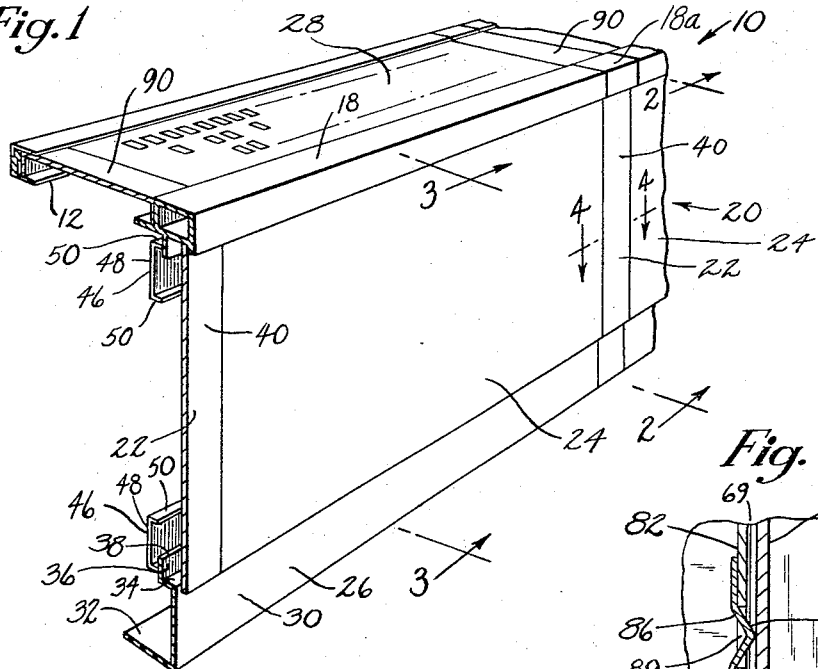
INVENTOR.
FRIEDRICH G. HONERKAMP
BY
McCormick, Paulding & Huber

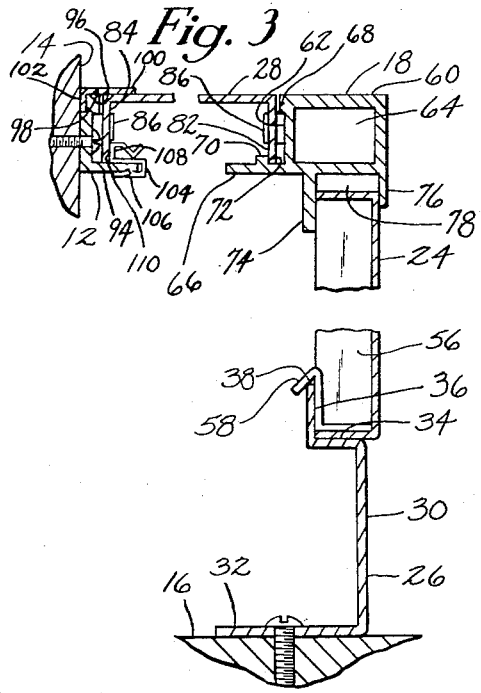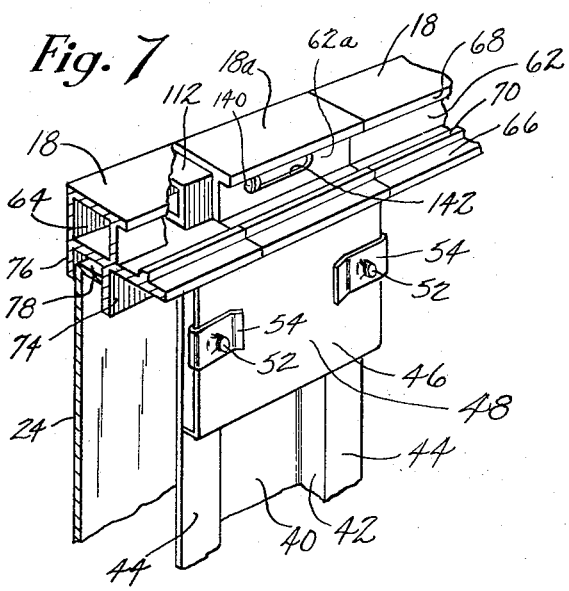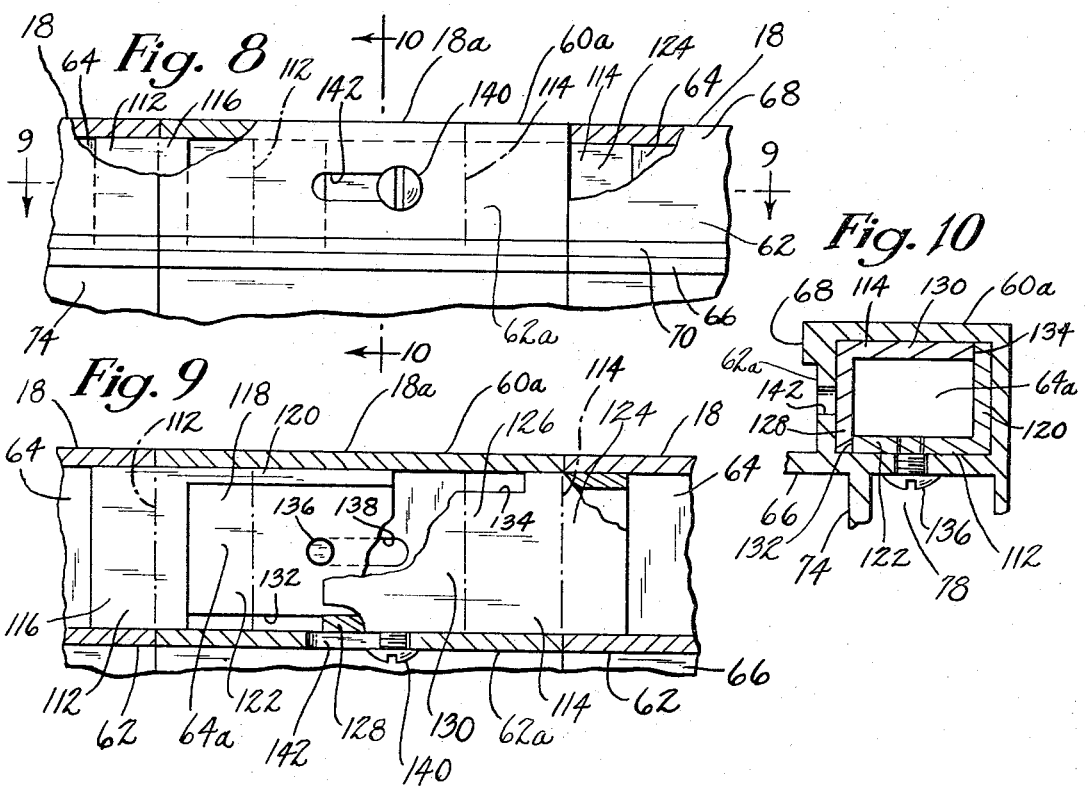

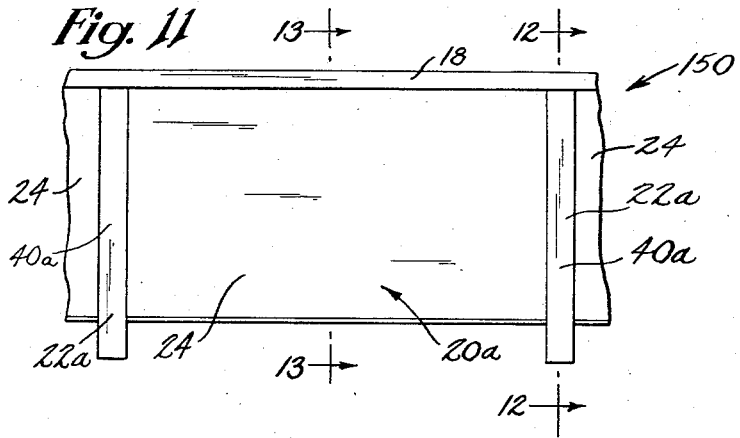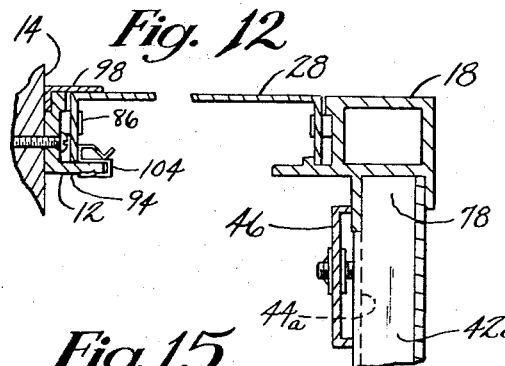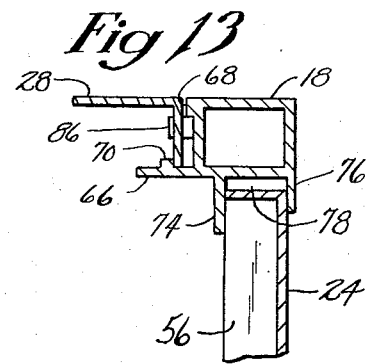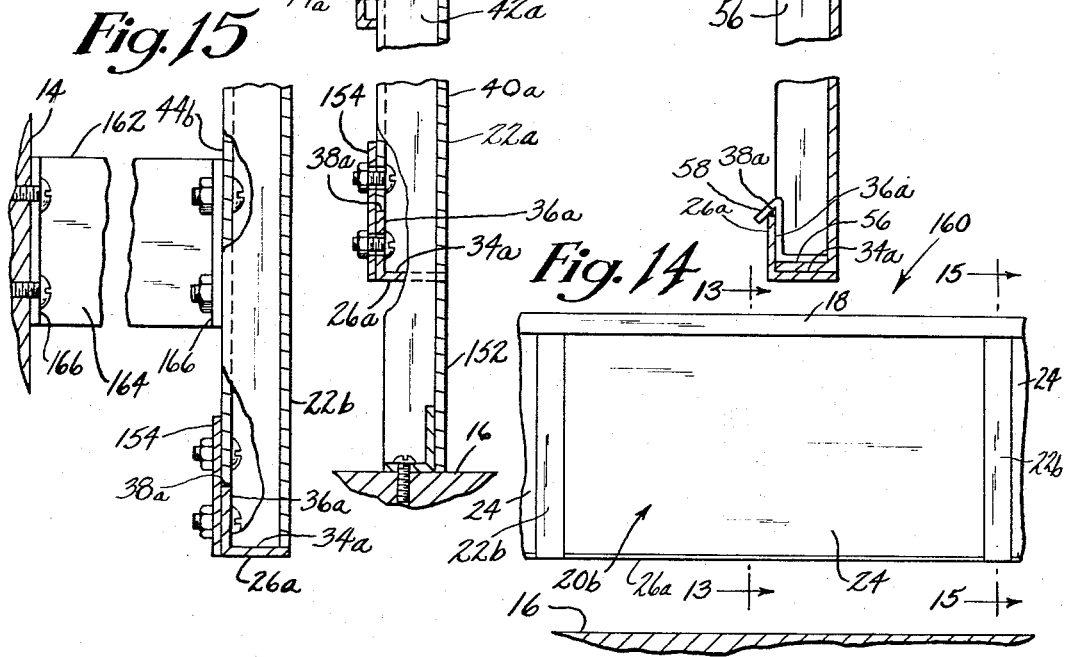

Feb. 27, 1968 F. G. HONERKAMP 3,370,521
VENTILATION ENCLOSURE STRUCTURE
Filed April 25, 1966 5 Sheets-Sheet 4
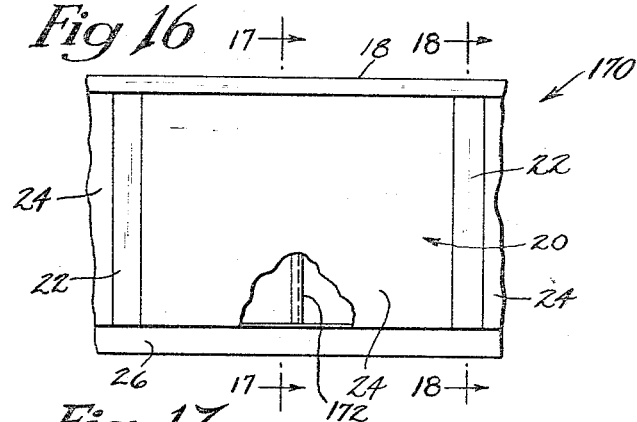
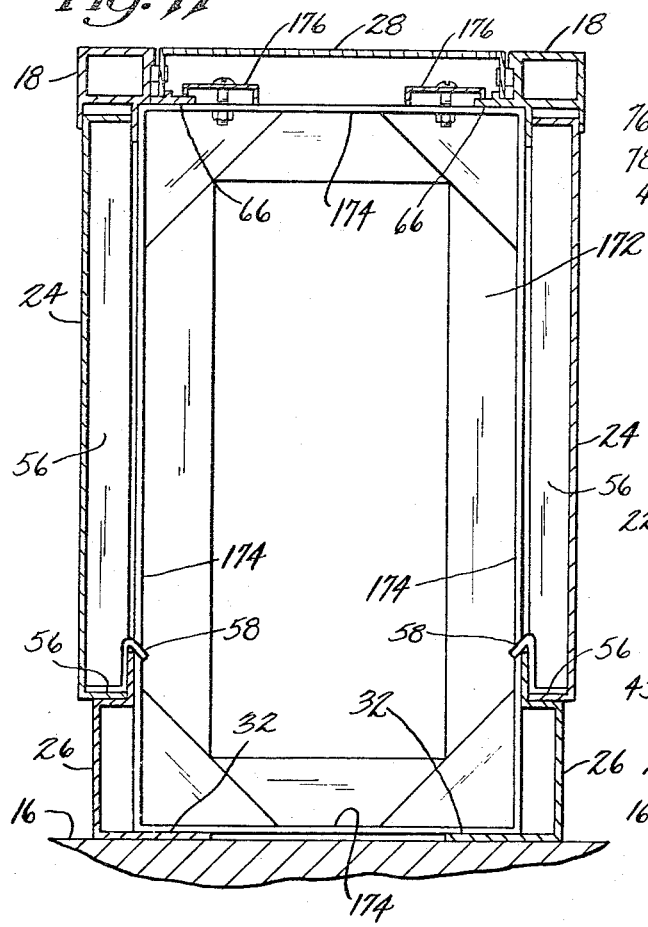
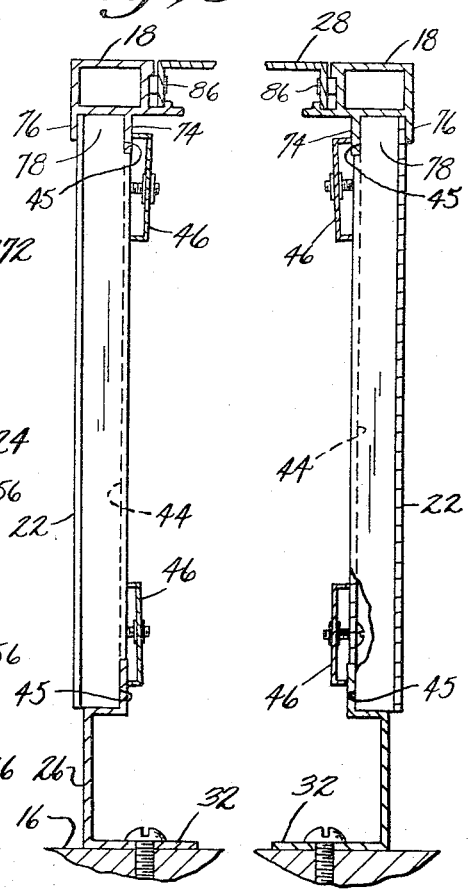

Feb. 27, 1968  F. G. HONERKAMP  3,370,521
VENTILATION ENCLOSURE STRUCTURE
Filed April 25, 1966  5 Sheets-Sheet 5
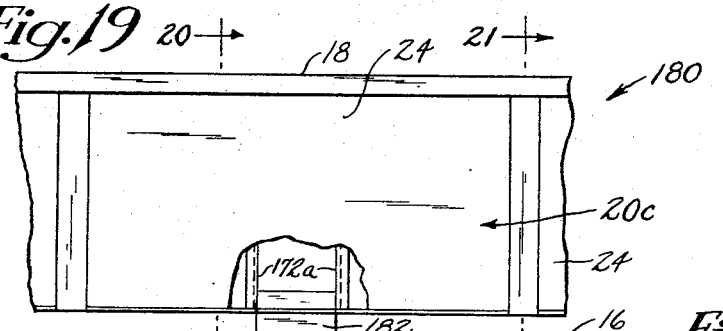
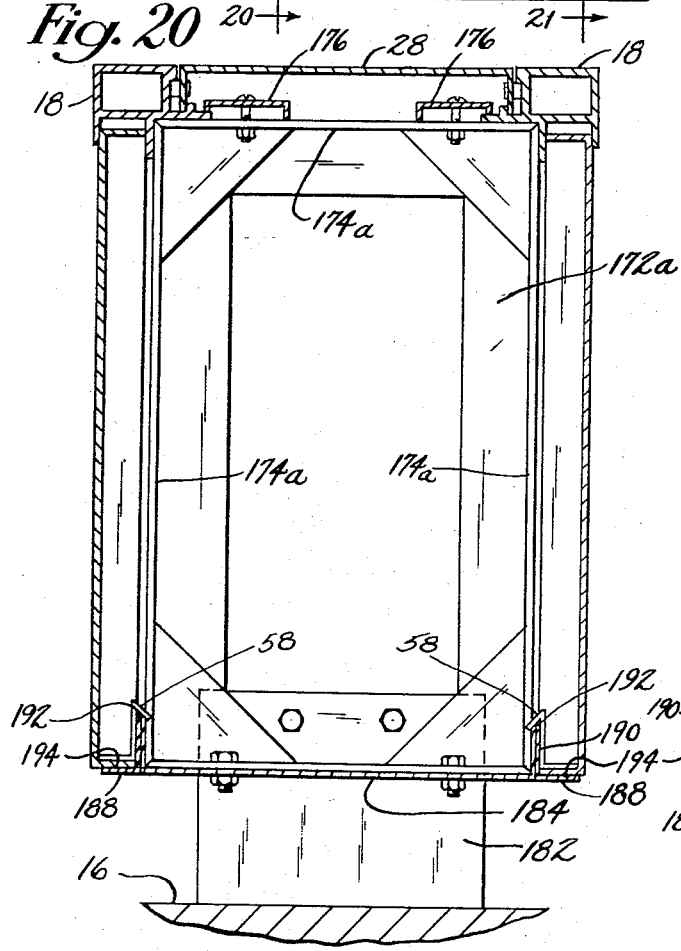
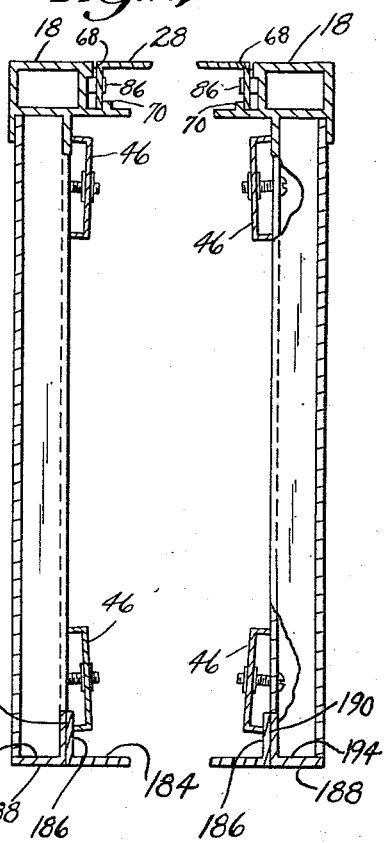

United States Patent Office 3,370,521
Patented Feb. 27, 1968

3,370,521
VENTILATION ENCLOSURE STRUCTURE
Friedrich G. Honerkamp, Clarks Summit, Pa., assignor to Dynamics Corporation of America, New York, N.Y., a corporation of New York
Filed Apr. 25, 1966, Ser. No. 545,148
17 Claims. (Cl. 98—40)

ABSTRACT OF THE DISCLOSURE

An air distribution enclosure structure for use in a room has a rear upper frame member attached to a wall of the room, a front upper frame member supported by a panel and forming the front of the structure and a top member serving as both a closure means for the top of the structure and as a horizontal structural connecting member between the front and rear upper frame members. Other embodiments of the invention disclose means for supporting the front panel both in the floor and in spaced relation thereabove. In still further embodiments of the invention the rear upper frame member is supported by a rear panel rather than by a wall of the room.

---

This invention relates in general to improvements in enclosure structures for room heating and air conditioning units and deals more particularly with a structure for site erection and assembly from prefabricated members.

The general object of the invention is to provide an enclosure structure of the aforedescribed character for assembly from a relatively small number of standardized structural members to meet various room requirements.

Another object of the invention is to provide an enclosure wherein readily removable access panels also serve as structural connecting members to permit maximum access to equipment housed within the enclosure.

A further object of the invention is to provide an enclosure wherein structural members are adjustable relative each to the other to compensate for associated room floor and wall surface irregularities.

Still another object of the invention is to provide an enclosure adapted to accommodate a room partition which may be erected to intersect the enclosure and extend therethrough and generally transversely thereof.

A still further object of the invention is to provide an enclosure which may be easily and rapidly erected and assembled with a minimum employment of skilled labor.

Other objects and advantages of the invention will be apparent from the following description and from the drawings forming a part thereof.

The drawings show preferred embodiments of the invention and such embodiments will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a fragmentary perspective view of an enclosure structure embodying the present invention and shows a transverse section through a mullion to reveal the general structure of the closure.

FIG. 2 is a somewhat enlarged sectional view taken along the line 2—2 of FIG. 1.

FIG. 3 is a somewhat enlarged sectional view taken along the line 3—3 of FIG. 1.

FIG. 4 is a somewhat enlarged sectional view taken along the line 4—4 of FIG. 1.

FIG. 5 is a fragmentary sectional view taken along the line 5—5 of FIG. 2.

FIG. 6 is a somewhat enlarged fragmentary perspective view of the wall bracket and top panel member assembly of the embodiment of FIG. 1.

FIG. 7 is a perspective view of the front upper frame member and front wall means of the embodiment of FIG. 1 as viewed from a position above and to the rear of the enclosure and shows a removable section of the upper frame member and a latch means for releasably retaining the removable section in assembly with the structure.

FIG. 8 is a somewhat enlarged fragmentary side elevational view of the front upper frame member of the embodiment of FIG. 1 and shows a removable section of the frame member and a latch means associated therewith.

FIG. 9 is a fragmentary sectional view taken along the line 9—9 of FIG. 8.

FIG. 10 is a sectional view taken along the line 10—10 of FIG. 8.

FIG. 11 is a fragmentary front elevational view of an enclosure and shows another embodiment of the invention.

FIG. 12 is a somewhat enlarged fragmentary sectional view taken along the line 12—12 of FIG. 11.

FIG. 13 is a somewhat enlarged sectional view taken along the line 13—13 of FIG. 11 and along the line 13—13 of FIG. 14.

FIG. 14 is a fragmentary front elevational view of an enclosure and shows a further embodiment of the invention.

FIG. 15 is a somewhat enlarged fragmentary sectional view taken along the line 15—15 of FIG 14.

FIG. 16 is a fragmentary front elevational view of an enclosure and shows still another embodiment of the invention.

FIG. 17 is a somewhat enlarged sectional view taken along the line 17—17 of FIG. 16.

FIG. 18 is a somewhat enlarged fragmentary sectional view taken along the line 18—18 of FIG. 16.

FIG. 19 is a fragmentary front elevational view of an enclosure and shows a still further embodiment of the invention.

FIG. 20 is a somewhat enlarged sectional view taken along the line 20—20 of FIG. 19.

FIG. 21 is a somewhat enlarged fragmentary sectional view taken along the line 21—21 of FIG. 19.

In its broadest aspect the invention contemplates an enclosure structure comprising laterally spaced front and rear horizontal elongated and longitudinally extending upper frame members which are disposed in vertically spaced relationship with a floor of a room. Support for the front upper frame member is provided by a longitudinally extending front wall means which comprises at least one substantially vertical panel member which extends downwardly from the frame member and toward the floor. At least one generally horizontally disposed top frame and lid member which is supported by the upper frame members provides a structural connection therebetween and also provides a closure for the top of the structure. Attaching means are also provided for releasably retaining the frame and lid member in coupled engagement with the upper frame members for secure structural connection therebetween.

According to a preferred embodiment of the invention the rear upper frame member is defined by a bracket fastened to a wall of a room in vertically spaced relationship with the room floor and support for the front wall means is provided by a base member fastened to the floor forwardly of the room wall. Thus, the structure cooperates with the floor and the wall of a room to provide an enclosure for housing air heating or cooling units extending along the room wall.

Other embodiments of the invention include upper frame members of modified form and associated wall means which cooperate to provide free standing enclosure structures.

Referring now to the drawings and particularly to FIGS. 1 and 2 an enclosure structure which is particularly adapted to cooperate with a wall and the floor of a room as aforedescribed is illustrated and indicated generally by the reference numeral 10. The enclosure 10 is assembled and erected in place from a plurality of prefabricated modular structural members and may be made to any desired length by providing additional components assembled in contiguous end-to-end relationship.

The enclosure 10 generally comprises a horizontally elongated and longitudinally extending rear upper frame member or wall bracket 12 which is fastened to a wall 14 above a floor 16 and an elongated longitudinally extending front upper frame member 18 which is supported above the floor in general horizontal alignment with the bracket 12. Support for the frame member 18 is provided by a front wall means indicated generally at 20 which preferably comprises a plurality of generally vertical disposed mullions 22, 22 and at least one substantially vertical panel member 24 which longitudinally extends between successively spaced mullions. The mullions 22, 22 and the panel member 24 are in turn supported by an elongated longitudinally extending base member 26 which rests on the floor 16 forwardly of the wall 14. A generally rectangular upper lid and frame member or top panel member 28 carried by the bracket 12 and by the upper frame member 18 provides lateral structural connection therebetween and is supported thereby and attached thereto in a manner which will be hereinafter further described. At this point it should be noted that in addition to providing lateral structural connection between the upper frame members the top panel member 28 also provides a substantial closure for the top of the structure.

Considering the enclosure 10 in further detail and referring particularly to FIGS. 2–6 the base member 26 which is preferably formed from sheet metal includes a vertically extending plate 30 which terminates at its lower end at an inwardly extending flange 32 which rests upon and which is fastened to the floor 16 forwardly of the wall 14. At its upper end the plate 30 has an inwardly directed platform 34 which terminates at its inner end in an upwardly extending skirt 36 having a longitudinally disposed edge 38. The base member 26 may comprise a single elongated unit or two or more units joined in contiguous end-to-end relationship. Further, the said member may comprise upper and lower units connected together for vertical adjustment to accommodate floor irregularities.

Each of the mullions 22, 22 is secured to the base member 26 and includes a generally rectangular vertically extending front panel portion 40 and inwardly directed vertically extending side walls 42, 42 which terminate in longitudinally directed vertically exending flanges 44, 44 vertically spaced from the upper and lower ends of the mullion. The side walls 42, 42 include upper and lower end portions which have inwardly facing edges 45, 45. Each mullion 22 is positioned with the bottom edges of its side walls 42, 42 generally resting on the platform 34 and with the inner edges 45, 45 at its lower end abutting the skirt 36.

Clamp members 46, 46 are provided for adjustably securing each mullion 22 to the base member 26 and to the upper front frame member 18 which will be hereinafter further described. Each clamp member 46 which is generally U-shaped opens outwardly and includes an elongated longitudinally extending and generally vertically disposed web 48 which has outwardly directed longitudinally extending upper and lower legs 50, 50. The upper leg 50 generally pivotally engages the inner surfaces of the flanges 44, 44 as best shown in FIG. 4. Two clamp screws 52, 52 project rearwardly through associated longitudinally spaced openings in the flanges 44, 44 and threadably engage longitudinally spaced generally U-shaped speed nuts 54, 54 which straddle the central portion of the web 46 at the opposite ends thereof in registry with a screw-receiving opening therethrough to urge the lower leg 50 and the edges 45, 45 toward clamping engagement with the skirt 36.

In the illustrated embodiment a plurality of front panel members 24, 24 are provided which are also supported on the base member 26. Each panel member 24 is generally rectangular and extends between successively spaced mullions 22, 22 and is surrounded by an inwardly directed border flange 56 the lower portion of which rests upon the platform 34. Inwardly facing edge portions of the border flange 56 generally engage the skirt 36 and associated mullion flanges 44, 44 to maintain the frontal surface of each panel member 24 in substantial coplanar vertical alignment with the mullion front panel portions 40, 40. Thus, it will be apparent that the panel portions 40, 40 and the panel members 24, 24 cooperate to provide a substantially vertical wall means.

The panel members 24, 24 are releasably retained between the mullions and for this purpose at least one panel clip is provided. Preferably a plurality of longitudinally spaced panel clips 58, 58 which are fastened to each panel member 24 and which engage the base member 26 serve to retain each panel member. Each clip 58 is preferably made from a piece of flat spring metal which is spot-welded or otherwise suitably attached to the lower border flange 56 and which extends generally vertically upwardly therefrom generally adjacent the skirt 36. The free end portion of the clip 58 is turned inwardly and downwardly over the edge 38 to retain the lower portion of an associated panel against lateral movement relative to the base member 26. The upper portion of each panel member 24 is releasably retained by the upper frame member 18 in a manner which will hereinafter be further described.

Mounted along the tops of the mullions 22, 22 is the upper frame member 18 which may be made from various materials and in various configurations, but preferably it is made from extruded metal and has a tubular body portion 60 which includes a longitudinally extending generally vertically directed inwardly facing web 62. The body portion has a generally rectangular cross section and for a purpose which will be hereinafter evident includes a longitudinally extending bore 64 which is also preferably rectangular. A longitudinally extending lower leg 66 is directed generally horizontally inwardly from the web 62 to provide support for the top panel member 28. Spaced upwardly from the leg 66 and projecting inwardly from the web 62 is a longitudinally extending lip 68 the upper surface of which is defined by the horizontal extension of the upper surface of the body portion 60. The frame member 18 also has a longitudinally extending rib 70 which projects upwardly from the leg 66 in horizontally inwardly spaced relationship to the lip 68 and which includes an outwardly facing surface 72.

Depending from the body portion 60 are inner and outer skirts 74 and 76 respectively, the outer skirt 76 being partially defined by the downwardly extension of the frontal surface of the body portion. The inner and outer skirts 74 and 76 partially defines a generally U-shaped downwardly opening channel 78 for receiving the upper ends of the mullions 22, 22 and for receiving and retaining the upper marginal edge portion of the panel members 24, 24. The upper end of each mullion 22 is adjustably secured to the inner skirt 74 by a clamp member 46 in the manner generally aforedescribed.

The top panel member 28 includes a horizontally disposed longitudinally extending lid portion 80 which has depending front and rear border flanges 82 and 84 which respectively engage the frame member 18 and the wall bracket 12. The front flange 82 rests upon the leg 66 so that the panel member 28 is maintained in general horizontal coplanar alignment with the upper surface of the body portion 60. The inner surface of the flange 82 engages the outwardly facing surface 72, the outer surface of the flange being in near engagement with the inner surface of the lip 68. At this point it should be noted that a slight clearance 69 normally exists between the flange 82 and the lip 68. The web 62 and the rib 70 cooperate with the flange 84 to provide an attaching means for coupling the top panel member 28 with the frame member 18 to prevent relative lateral movement therebetween.

Secured to the flange 82 is at least one panel latch 86 which cooperates with the lip 68 to provide a further attaching means for releasably retaining the top panel member 28. Preferably a plurality of panel latches 86, 86 are provided on each of the flanges 82 and 84. The panel latches on the rear flange 84 cooperated with a lip on the wall bracket 12 which will be hereinafter further described. As best shown in FIG. 5 each panel latch 86 is a longitudinally extending cantilever member formed from a piece of flat spring metal which is spot-welded or otherwise suitably secured to the inner surface of the flange 82. The free end portion of the panel latch 86 includes a central portion 88 which is bowed generally outwardly through an associated longitudinally extending slot 89 through the flange 82. The central portion 88 engages the web 62 below and beyond the inner edge of the lip 68 to prevent vertical movement of the top panel member 28 relative to the frame member 18. In addition to retaining the top panel members the panel latches serve to prevent objectionable panel vibration or rattle in response to building vibration. To release the panel latch 86 a thin blade, such as the blade of a knife, may be inserted downward through the clearance 69 between the flange 82 and the lip 68 and moved longitudinally into engagement with the inclined or outwardly bowed portion 88 to bias the latch inwardly or away from the lip 68.

The length of the top panel member 28 may vary, but preferably and as best shown in FIG. 1 it has a longitudinal dimension substantially equal to the longitudinal dimension of the front panel member 24. A plurality of top filler panels 90, 90 are preferably provided which are constructed and arranged in a manner generally similar to the top panel member 28. In assembly, each top panel member 28 is substantially transversely aligned with a front panel member 24 and each filler panel is similarly aligned with a corresponding mullion panel 40.

At least one of the top panel members 28, 28 is perforated as shown in FIG. 1 and may obviously comprise elongated louvered or open slots as well as the small individual openings shown. Further, one or more of the front panel members 24, 24 may be louvered or otherwise perforated to permit air circulation through the enclosure.

The wall bracket 12 has a longitudinally extending vertically directed web 92 which generally engages the wall 14 and which is fastened thereto and a longitudinally extending lower leg 94 which is directed generally horizontally inwardly from the web 92. As previously noted the wall bracket 12 includes a lip 96 which cooperates with associated panel latches 86, 86 in the manner aforedescribed and which projects inwardly from the web 92 in upwardly spaced relationship with the leg 94. A longitudinally extending angle member 98 having an inwardly directed skirt 100 which overlays the rear marginal edge portion of the top panel member 28 is located directly above the angle bracket 12 and includes a depending leg 102 which is received in a slot defined by the wall 14 and a longitudinally extending upwardly and outwardly opening recess in the web 92.

Lateral structural connection between the top panel member 28 and the angle bracket 12 is provided by at least one clip which engages the leg 94 and which may be adjustably positioned thereon. Preferably a plurality of clips are provided which cooperate with the web 92 and the flange 84 to provide an attaching means for releasably coupling the top panel member with the wall bracket 12.

In the presently preferred embodiment of the invention a Tinnerman Cable Clip is employed for this purpose, such a clip being designated by the numeral 104 and best shown in FIGS. 2 and 6. It will be noted that the clip 104 has a generally U-shaped outwardly opening base portion which is adapted to springingly engage the leg 94 and which includes two longitudinally spaced inwardly inclined teeth 106, 106 adapted to dig into the leg so that the clip may not be easily removed therefrom. The clip 104 also includes an upwardly projecting portion 108 which provides an outwardly facing surface 110 for engaging the rear border flange 84.

In the presently preferred embodiment of the invention provision is made to accommodate a room partition (not shown) which may be erected to intersect the enclosure 10 and extend transversely therethrough. For this reason, at least one of the upper frame members includes a removable section which is generally transversely aligned with an associated mullion panel and which preferably has a longitudinal dimension substantially equal to the longitudinal dimension of said associated panel. In FIG. 1, the upper frame member 18 is shown to include such a removable section which is indicated at 18a and which is releasably retained in contiguous end-to-end and longitudinally aligned relationship with adjacent sections of the frame member.

From the foregoing description it will be evident that a mullion 22 and a filler panel 90 associated with the removable section 18a may also be readily removed without impairing the structure. It should be further evident that the base member 26, the wall bracket 12 and the angle bracket 98 may each respectively be provided with a removable section which is transversely aligned with the section 18a and which may be also removed to provide a transversely extending opening through the enclosure 10 to accommodate a room partition as aforeindicated.

Considering now the removable section of the frame member in further detail and referring particularly to FIGS. 7–10 the section 18a is shown connecting successively longitudinally spaced sections of a frame member 18 and comprises a portion of a frame member 18 which includes a tubular body portion 60a and a bore 64a. Latch members 112 and 114 are telescopically received in opposite ends of the bore 64a and are longitudinally slidable relative to the bore and to each other to effect connection with adjacent sections of the frame member 18.

Each latch member is made from a longitudinally elongated piece of tubular metal which has a generally rectangular cross section and a rectangular bore. The latch member 112 has an outer portion 116 which has a rectangular cross section and includes an inner portion 118 formed by the longitudinally inwardly extension of a front wall 120 and a bottom wall 122. Similarly, the latch member 114 has a rectangular outer portion 124 and an inner portion 126 formed by the inwardly extension of a rear wall 128 and a top wall 130. The rear marginal edge portion of the bottom wall 122 and the front marginal edge portion of the top wall 130 are relieved to define edge surfaces 132 and 134 which respectively slidably engage the walls 128 and 120. Thus, the inner portions 118 and 126 are arranged for slidable interengagement to facilitate the relative movement of the two latch members within the confines of the bore 64a.

A means for moving the latch member 112 longitudinally relative to the bore 64a and for limiting its movement relative thereto is provided by a screw 136 which projects upwardly through an elongated longitudinally extending slot 138 in the bottom wall of the body portion 60a and which threadably engages the wall 122. Movement of the latch member 114 is similarly effected by a screw 140 which cooperates with a slot 142 in the web 62a and which threadably engages the wall 128.

Each of the latch members 114 and 116 is movable between a connecting position and a releasing position relative to the section 18a. In the connecting position, each of the outer portions 116 and 124 project longitudinally outwardly from an associated end of the bore 64a to engage an associated portion of the bore 60 in an adjacent section of the frame member 18. In the releasing or broken line positions of FIGS. 8 and 9 the latch members 112 and 114 are each wholly received within the bore 64a to permit the section 18a to be moved transversely of the associated sections of the frame member 18.

Although the means for connecting the frame members has been described with reference to a removable section thereof, it should be evident that similar connecting means may also be provided for retaining contiguous elongated frame sections in longitudinally aligned relationship.

The adjustable features of the enclosure provide for rapid and accurate site erection and assembly. The bracket member 12 is secured to the wall 14 a proper distance above the floor 16 by a plurality of fasteners which project outwardly through the web 92 as best shown in FIG. 2. It will be noted that sufficient space is provided below the lip 96 and between the web 92 and the rear flange 84 to accommodate the heads of the fasteners.

The base member 26 is fastened to the floor in proper spaced relationship with the wall 14. Thereafter the mullions 22, 22 are mounted upon and secured to the base member 26 by clamp members 46, 46. The front upper frame member 18 is then attached to the upper ends of the mullions 22, 22 by additional clamp members 46, 46. Since the mullions 22, 22 are both longitudinally and vertically adjustable relative to the base member 26 and to the upper frame member 18 the front wall means 20 and the upper frame member 18 may be conveniently adjusted relative to the base member 26 to compensate for any floor irregularities.

The top panel member 28 is next placed in the assembled position with the front flange 22 in coupled engagement with the upper frame member 18 and the rear flange 84 resting upon the leg 94. The clips 104, 104 are positioned in longitudinally spaced series on the leg 94 so that the outwardly facing surface 110 on each clip generally engages the inner surface of the flange 84. The clips 104, 104 provide an adjustable retaining means for coupling the top panel member 28 with the wall bracket 12 to compensate for any transverse deflection in the elongated wall bracket which may be caused by wall surface irregularities. This arrangement eliminates the need for shimming the bracket relative to the wall to compensate for such irregularities. The angle bracket 98 is next positioned above the wall bracket 12 with its depending skirt 102 being received in the aforedescribed slot defined by the wall 14 and the web 92.

It will be noted that the inwardly directed leg 100 overlays the rear marginal edge portion of the upper panel 28 thereby wholly concealing the clearance between the lip 96 and the rear flange 84 which may be irregular as a result of any transverse deflection in the wall bracket 12. Provision may be made to clampingly engage the skirt 102 between the web 92 and the wall 14, but preferably the skirt is received snugly therebetween so that the angle bracket 98 may be easily removed to permit access to the rear panel latches 86, 86.

To complete the enclosure 10 the marginal edge portion of each panel member 24 is inserted into an associated portion of the channel 78. Thereafter the panel is moved to a vertical position between associated mullions and is lowered to bring its lower border flange to rest on the platform 34 with the clips 58, 58 generally engaging the edge 38.

In the further embodiments of the invention hereinafter described construction is similar and some parts are substantially identical to parts of the aforedescribed embodiment. For reasons of clarity and brevity such identical parts will be designated by the same numerals used in the description of the previously considered enclosure 10.

In FIGS. 11–13 is shown another embodiment of the invention which cooperates with a floor and wall of a room to provide an enclosure indicated generally at 150. The enclosure 150 includes a wall bracket 12, a front upper frame member 18, and a top panel member 28 which are identical in all respects with the corresponding parts of the previously described embodiment. However, the enclosure 150 differs from that previously described principally in the construction of the front wall means. Specifically, the wall means which is indicated generally at 20a includes at least one panel member 24 and a plurality of vertically extending mullions 22a, 22a each of which has a lower end portion 152 which rests upon and which is fastened to a floor 16.

Like the mullions 22, 22 each mullion 22a includes a generally rectangular vertically extending front panel portion 40a which has inwardly directed vertically extending side walls 42a, 42a which terminate in longitudinally directed vertical extending flanges 44a, 44a which are spaced from the upper and lower ends of the mullion.

A panel support angle 26a extends longitudinally between successively spaced mullions 22a, 22a in vertically spaced relationship with the floor 16 and includes a generally horizontally disposed longitudinally extending platform 34a which terminates at its inner end in an upwardly extending skirt 36a having a longitudinally disposed upper edge 38a. The skirt 36a is longitudinally aligned with the flanges 44a, 44a on associated mullions. Each end of the platform 34a is substantially horizontally aligned with the lower end of an associated mullion flange 44a. To facilitate bolt connection between the skirt 36a and an associated mullion flange 44a, a gusset plate 154 is provided at each end of the support angle 26a. Each gusset plate 154 is provided with enlarged bolt receiving openings to permit the angle member 26a to be adjustably positioned relative to the associated mullions as may be necessary to compensate for floor surface irregularities.

The panel member 24 which is substantially identical to the panel member 24 of the embodiment 10 extends between successive mullions 22a, 22a with the lower portion of its border flange 56 resting on the platform 34a and with retaining clips 58, 58 generally engaging the edge 38a. The upper marginal edge portion of the panel 24 is retained in the channel 78 in the manner aforedescribed.

Referring now to FIGS. 13–15 of the drawings, the present invention is shown embodied in another enclosure 160 which cooperates with the wall of a room. Like the previously described enclosures, the enclosure 160 includes a wall bracket 12, a front upper frame member 18, and a top panel member 28. However, the enclosure 160 differs from those earlier described in the general construction and arrangement of its front wall means which is indicated generally at 20b and which includes a plurality of generally vertically extending mullions 22b, 22b and at least one vertically extending panel member 24.

Each of the mullions 22b, 22b is secured at its upper end to the front upper frame member 18 by a clamp member 46 and extends vertically downwardly therefrom terminating above the floor 16. Each mullion 22b is supported in spaced relation to the floor by a transversely extending bracket member 162 which provides connection between each mullion and the associated wall 14 to which the bracket member 12 is also attached. Preferably, the bracket member includes a generally rectangular vertically disposed central portion 164 terminating in longitudinally directed generally vertically extending end flanges 166, 166. One of the flanges 166 is fastened to the wall 14 and the other is bolted to an associated mullion flange 44b.

A panel support angle 26a extends longitudinally between successively spaced mullions 22b, 22b and includes a generally horizontally disposed longitudinally extending platform 34a which is substantially horizontally aligned with the lower ends of the mullions 22b, 22b. At its inner end the platform terminates in an upwardly directed skirt 36a which extends longitudinally between associated flanges 44a, 44a on successively spaced mullions.

The panel member 24 which extends between successive mullions 22b, 22b is supported on the platform 34a and retained by clips 58, 58 and by the channel 78 as previously discussed.

In FIGS. 16 through 18 the invention is shown embodied in a free standing enclosure indicated generally at 170. The enclosure 170 generally comprises substantially vertical transversely spaced and longitudinally extending front and rear wall means indicated generally at 20, 20 which are similar in construction and which can be used interchangeably on either side of the structure. Like the wall means of the enclosure 10, each wall means 20 generally comprises a base member 26 which rests upon and is fastened to a floor 16 and a plurality of longitudinally spaced mullions 22, 22 which are secured to and extend upwardly from the base member 26. Each wall means 20 also includes at least one substantially vertical panel member 24 which extends between successively spaced mullions. Each wall means 20 provides support for an upper frame member 18 which is mounted along the tops of the mullions 22, 22 and which is secured thereto by clamp members 46, 46 in the manner aforedescribed and as best shown in FIG. 18. The upper frame members 18, 18 are interchangeable and are substantially identical to the front upper frame member 18 aforedescribed.

Structural connection between the upper frame members 18, 18 is provided by the top panel member 28 which is releasably secured to the respectively associated upper frame members 18, 18 in the manner previously indicated.

To impart additional rigidity to the structure to aid in maintaining the wall means 20, 20 and the top panel member 28 in generally rectangular relationship at least one support frame is preferably provided. The general construction and arrangement of the support frame may vary but preferably and as shown the support frame comprises a vertically disposed generally rectangular frame 172 which is fabricated from metal and which extends transversely generally intermediate opposite panel members 24, 24 and between successively spaced mullions 22, 22. Preferably the frame 172 includes a longitudinally directed surrounding border flange 174 a portion of the lower surface of which rests upon the base member flanges 32, 32. The upper surface of the flange 174 engages the lower surfaces of the upper frame member legs 66, 66. Various arrangements may be provided for securing the wall means 20, 20 in fixed relationship to the frame means 172. In the presently preferred embodiment of the invention, the legs 66, 66 are secured to the upper portion of the flange 174 by generally U-shaped clamp members 176, 176 which are generally similar in construction and substantially identical in function to the clamp members 46, 46 previously discussed.

FIGS. 19–21 illustrate still another embodiment of the invention which provides a free standing enclosure indicated generally at 180 for use in a room which has a duct section projecting generally vertically upwardly from the floor.

The enclosure 180 which is shown erected on and including a duct section 182 is generally similar in many respects to the free standing enclosure 170 but differs therefrom particularly in the construction and arrangement of the wall means and the support means therefor.

Specifically, support for the enclosure 180 is provided by a pair of longitudinally spaced support frames 172a, 172a carried by the upwardly opening duct section 182 which is shown to have a generally rectangular cross section. Like the support frame of the previously discussed embodiment, each of the frames 172a, 172a is preferably generally rectangular and includes a surrounding border flange 174a. The frames 172a, 172a are bolted to the duct section in vertically spaced relation to the floor and extend generally upwardly therefrom.

A pair of upper frame members 18, 18 rest upon the support frames 172a, 172a and are secured thereto by clamp members 176, 176. Resting upon the frame members 18, 18 is a top panel member 28 which provides longitudinally extending structural connection therebetween.

The bottom of the enclosure 180 is formed by a generally horizontally disposed bottom panel 184 which has a generally central opening through which the duct section 182 extends upwardly. The panel 184 which engages and is preferably bolted to the bottom portion of the flange 174a includes longitudinally extending upwardly directed border flanges 186, 186 which lie adjacent associated portions of the flange 174a.

Associated with each border flange 186 is a panel support angle 188 which includes an upwardly extending skirt 190 which has a longitudinally extending upper edge 192 adjacent the flange 186 and which is preferably spot welded or otherwise suitably fastened thereto. A longitudinally extending panel supporting platform 194 is directed generally horizontally outwardly from the skirt 190 in horizontal alignment with the bottom panel 184. Substantially identical and interchangeable wall means 20c, 20c respectively secured to the frame members 18, 18 extend downwardly therefrom and terminate at the platform 194.

Each wall means 20c generally comprises a plurality of mullions 22c, 22c which are generally similar to the mullions of the previous embodiment, and at least one vertical panel member 24 which is releasably retained and which extends between successively spaced mullions.

The upper end of each mullion 22c engages and is clamped to an associated frame member 18 as aforedescribed. The lower end of each mullion rests on an associated platform 194 and is similarly clamped to an associated skirt 190 and border flange 186 as best shown in FIG. 21. Each panel member 24 rests upon an associated portion of a platform 194 and is retained by clips 58, 58 which engage the edge 192 and by an upper frame member 18.

The invention claimed is:

1. An air distribution enclosure structure for use in a room having a contiguous wall and floor, said enclosure comprising laterally spaced front and rear horizontally elongated and longitudinally extending upper frame members disposed in vertically spaced relationship with the room floor, a longitudinally extending front wall means supporting the front upper frame member and extending downwardly therefrom toward the room floor and comprising at least one substantially vertical panel member, at least one generally horizontally disposed top member supported by and connected between said upper frame members, said top member serving both as an upwardly exposed closure means for the top of the structure and as a horizontal structural connection between said front and rear upper frame members, and said top member in its latter function engaging and restraining positively the said frame members against relative movement in at least one horizontal direction, and attaching means for releasably retaining said top member in coupled engagement with said upper frame members.

2. An enclosure structure as set forth in claim 1 wherein said attaching means includes a longitudinally extending generally vertically directed inwardly facing web defined by at least one of the said upper frame members, a longitudinally extending lower leg generally horizontally inwardly directed from said web, a longtitudinally extending flange depending from said top member and resting on said leg proximate said web, and means providing an outwardly facing surface fixed relative to said leg and generally engaging the inwardly facing surface of said flange.

3. An enclosure structure as set forth in claim 2 wherein said means providing an outwardly facing surface is a clip engaging said leg.

4. An enclosure structure as set forth in claim 2 wherein said means providing an outwardly facing surface is a rib upwardly projecting on said leg.

5. An enclosure structure as set forth in claim 2 wherein said attaching means includes an inwardly projecting lip on said web upwardly spaced from said leg and in near engagement with the outwardly facing surface of said flange and a latch on said top member biased outwardly below and beyond the inner edge of said lip.

6. An enclosure structure as set forth in claim 2 wherein said one frame member includes a longitudinally elongated downwardly opening channel, an upper marginal edge portion of said panel member being received within and retained by said channel.

7. An enclosure structure as set forth in claim 2 wherein said rear frame member is an angle bracket.

8. An enclosure structure as set forth in claim 7 wherein said angle bracket is attached to the room wall with said web generally engaging said wall, said structure including a horizontally elongated and longitudinally extending angle member having an inwardly directed skirt overlaying an associated marginal edge portion of said top member and including a depending leg retained between said room wall and said web.

9. An enclosure structure as set forth in claim 1 wherein at least one of said upper frame members includes at least two longitudinally elongated sections longitudinally aligned in contiguous end-to-end relationship and wherein connecting means is provided for releasably retaining said sections in longitudinally aligned relationship.

10. An enclosure structure as set forth in claim 9 wherein said connecting means comprises a longitudinally extending bore a portion of which is defined by each of the said sections, and a latch member slidably received in said bore and movable between a connecting position and a releasing position, said latch member in the connecting position being partially received within each of the said sections, said latch member in the releasing position being wholly received within one of the said sections.

11. An enclosure structure as set forth in claim 1 wherein said top member is perforate.

12. An enclosure structure as set forth in claim 1 wherein said structure includes a base member comprising a vertically extending plate terminating at its lower end in a laterally extending flange which rests upon and is fastened to said floor and having at its upper end an inwardly directed platform, said panel member having an inwardly directed flange along its lower edge resting on said platform.

13. An enclosure structure as set forth in claim 1 wherein said wall means includes a plurality of generally vertically disposed mullions, each of said mullions being adjustably secured at its upper end to said associated one frame member and extending downwardly therefrom, said panel member extending between successive said mullions and being releasably supported therebetween.

14. An enclosure structure as set forth in claim 13 wherein the lower end of each of the said mullions rests upon the floor and wherein said structure includes a base member extending between and adjustably secured to successive said mullions in vertically spaced relation to said floor and to said one frame member, said panel being supported by said base member.

15. An enclosure structure as set forth in claim 13 wherein said top frame and lid member has a longitudinal dimension substantially equal to the longitudinal dimension of said panel member and including a plurality of top filler panels, each of the said filler panels having a longitudinal dimension substantially equal to the longitudinal dimension of a mullion.

16. An enclosure structure as set forth in claim 1 wherein said structure includes a longitudinally extending rear wall means supporting said rear frame member and comprising at least one substantially vertical panel member, and at least one generally vertically disposed support frame extending transversely between said front and rear wall means and fastened in fixed relationship thereto for maintaining said front and rear wall means and said top member in generally rectangular relationship.

17. For use in a room which includes a duct section extending generally upwardly from the floor, an enclosure structure as set forth in claim 16, wherein said support frame is fastened to said duct section and extends upwardly therefrom, said support frame maintaining said front and rear wall means in vertically spaced relationship with said floor.

References Cited

UNITED STATES PATENTS

| | | | |
|---|---|---|---|
| 2,424,217 | 7/1947 | Bales | 312—257 |
| 2,796,015 | 6/1957 | Hayes | 98—40 |
| 2,822,742 | 2/1958 | Ochs et al. | 98—40 |
| 2,866,676 | 12/1958 | Goebel | 312—257 |
| 3,180,459 | 4/1965 | Liskey | 52—498 X |
| 3,230,025 | 1/1966 | Hamilton et al. | 312—257 |
| 3,294,276 | 12/1966 | Kemp et al. | 312—257 |
| 3,318,647 | 5/1967 | Bishop | 165—128 X |

ROBERT A. O'LEARY, *Primary Examiner.*

W. E. WAYNER, *Assistant Examiner.*